(12) United States Patent
Dudar (10) Patent No.: US 9,878,609 B2
(45) Date of Patent: Jan. 30, 2018

(54) METHOD AND SYSTEM FOR OPERATING ACTIVE GRILLE SHUTTERS

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 159 days.

(21) Appl. No.: 14/925,827

(22) Filed: Oct. 28, 2015

(65) Prior Publication Data

US 2017/0120743 A1   May 4, 2017

(51) Int. Cl.
*B60R 22/00* (2006.01)
*E05F 15/00* (2015.01)
*G05D 1/00* (2006.01)
*B60K 11/08* (2006.01)
*F01P 7/02* (2006.01)
*F01P 1/00* (2006.01)

(52) U.S. Cl.
CPC .............. *B60K 11/085* (2013.01); *F01P 7/02* (2013.01); *B60K 2700/00* (2013.01); *F01P 1/00* (2013.01)

(58) Field of Classification Search
CPC ........ B60K 11/085; B60K 11/08; F01P 11/10; F01P 1/00; F01P 7/02

USPC .................... 701/36, 49; 123/41.04
See application file for complete search history.

(56) References Cited

U.S. PATENT DOCUMENTS

| 8,683,854 | B2* | 4/2014 | Pursifull | F01P 11/16 73/114.68 |
|---|---|---|---|---|
| 2013/0338870 | A1 | 12/2013 | Farmer et al. | |
| 2015/0197148 | A1* | 7/2015 | Kobayashi | B60K 11/085 701/49 |
| 2015/0369147 | A1* | 12/2015 | Itoh | B60W 20/10 701/22 |
| 2017/0120743 | A1* | 5/2017 | Dudar | B60K 11/085 |

* cited by examiner

*Primary Examiner* — Isaac Smith
(74) *Attorney, Agent, or Firm* — Julia Voutyras; McCoy Russell LLP (57) ABSTRACT

Methods and systems are provided for a vehicle comprising, during a first condition comprising when an active grille shutter (AGS) position change over a second interval is less than a threshold position change: stalling an AGS motor for a first interval; calculating a fuel economy change over the first interval; and determining a degradation of an AGS sensor based on the fuel economy change being greater than a threshold fuel economy change over the first interval. In this way, various degradation modes of the AGS including faulty AGS position sensors and a mechanical AGS degradation can be differentiated. Furthermore, in the event of an AGS position sensor degradation, the AGS position can be inferred so that operation of the AGS and the fuel consumption reduction advantages conferred therefrom can be preserved.

20 Claims, 6 Drawing Sheets

METHOD AND SYSTEM FOR OPERATING ACTIVE GRILLE SHUTTERS

BACKGROUND/SUMMARY

Active grille shutters (AGS) are being incorporated into vehicles in order to help meet stricter fuel economy standards. For example, at higher vehicle speeds, AGS automatically close to block airflow through the engine cooling system to reduce vehicle drag and fuel consumption; when starting a cold engine, AGS remain closed to aid in reaching higher engine temperatures more quickly to reduce vehicle emissions and fuel consumption. AGS may be controlled using feedback AGS position sensors.

A conventional approach for diagnosing an AGS system degradation in a vehicle is shown by Farmer et al. in U.S. Patent Application Publication 2013/0338870 where an AGS diagnostic is performed based on receiving a mechanical fault condition signal and a temperature signal, and an AGS system may be disabled if a mechanical degradation is detected.

The inventors herein have recognized potential issues with such systems. Namely, such systems fail to address AGS operation degradation due to faulty AGS position sensors. Furthermore, when AGS position sensor degradation occurs, disabling the AGS system foregoes any fuel consumption reduction advantages that may be preserved by continuing AGS operation.

One approach that at least partially addresses the above issues includes a method for a vehicle, comprising, during a first condition comprising when an AGS position change over a second interval is less than a threshold position change: stalling an AGS motor for a first interval; calculating a fuel economy change over the first interval; and determining a degradation of an AGS sensor based on the fuel economy change being greater than a threshold fuel economy change over the first interval.

In another example, a vehicle system may comprise: an engine; AGS, including an AGS position sensor and an AGS motor; and a controller, including executable instructions to, in response to an AGS position change being less than a threshold position change during a measurement period, actuate the AGS motor to move the AGS to a more closed position until a stall current is drawn by the AGS motor; calculate a fuel economy increase over a first interval while the stall current is drawn by the AGS motor; and determine a degradation of the AGS position sensor based on the fuel economy change being greater than a threshold fuel economy increase.

In another example, a method for a vehicle, executed by an onboard vehicle controller may comprise: in response to an AGS position change being less than a threshold position change during a measurement period, actuating an AGS motor to move the AGS to the more closed position until a stall current is drawn by the AGS motor; calculating a fuel economy increase over a first interval while the stall current is drawn by the AGS motor; and determining a degradation in an AGS sensor based on the fuel economy increase being greater than a threshold fuel economy increase.

In this way, a technical result may be achieved in that degradation modes of the AGS including faulty AGS position sensors or a mechanical AGS degradation can be distinguished. Furthermore, in the event of an AGS position sensor degradation, the AGS position can be inferred so that operation of the AGS and the fuel consumption reduction advantages conferred therefrom can be preserved. Further still, inferring the AGS position via AGS motor stall current is more reliable over both higher and lower ambient temperatures as compared to inference of AGS position via engine temperature changes. The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
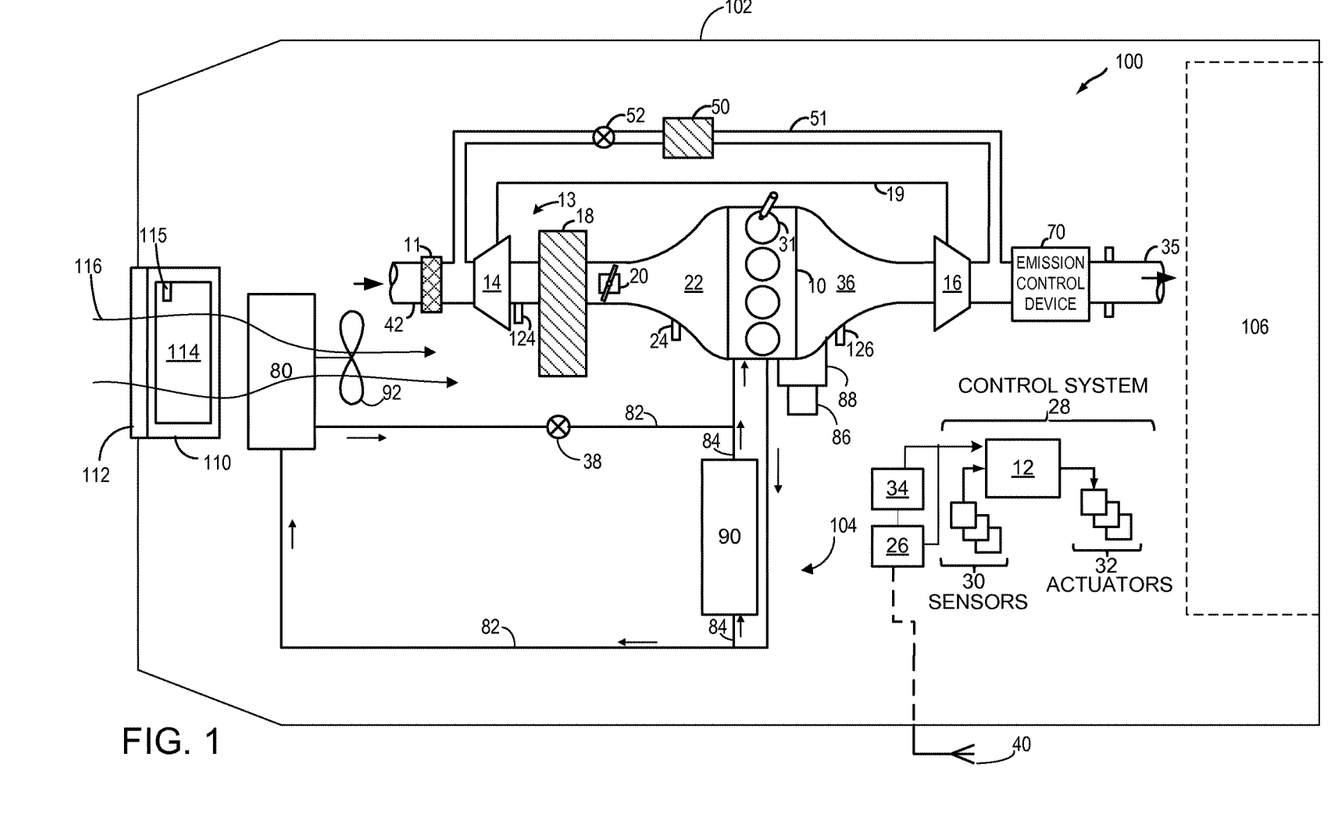
FIG. 1 shows a schematic diagram of a vehicle system, including active grille shutters, and an engine.
Figure 2:
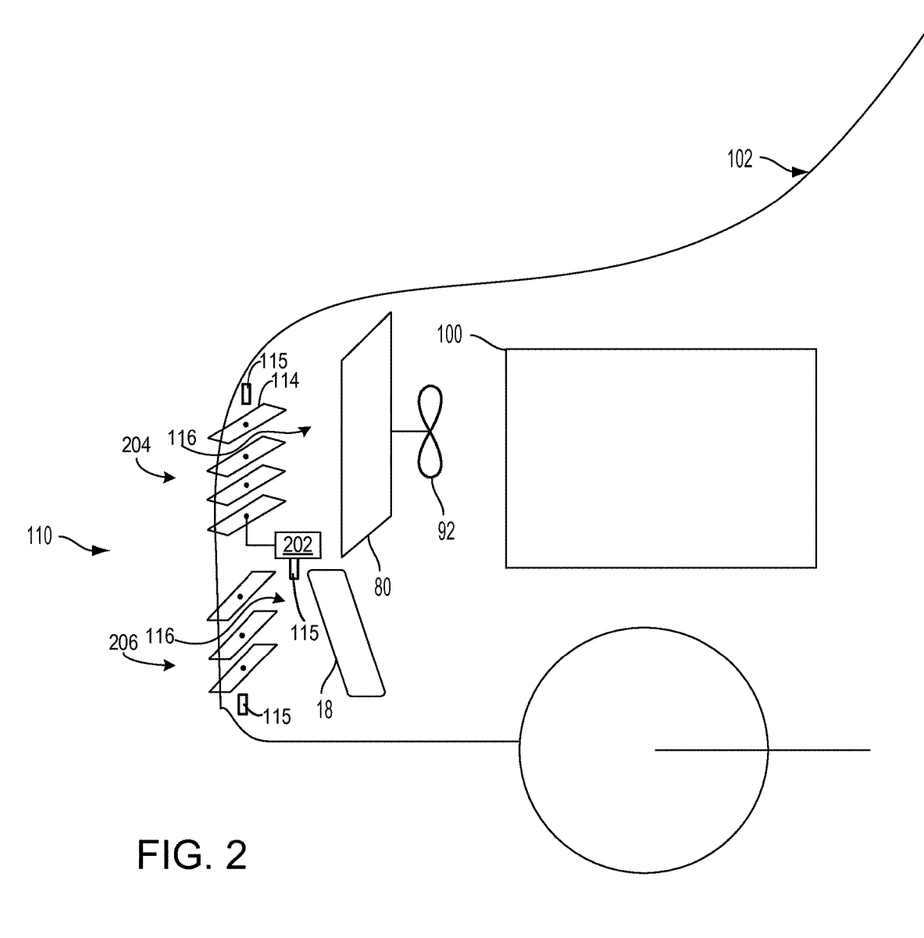
FIG. 2 shows partial schematic of a vehicle of FIG. 1, including the active griller shutters, a radiator, and the engine.
Figure 4:
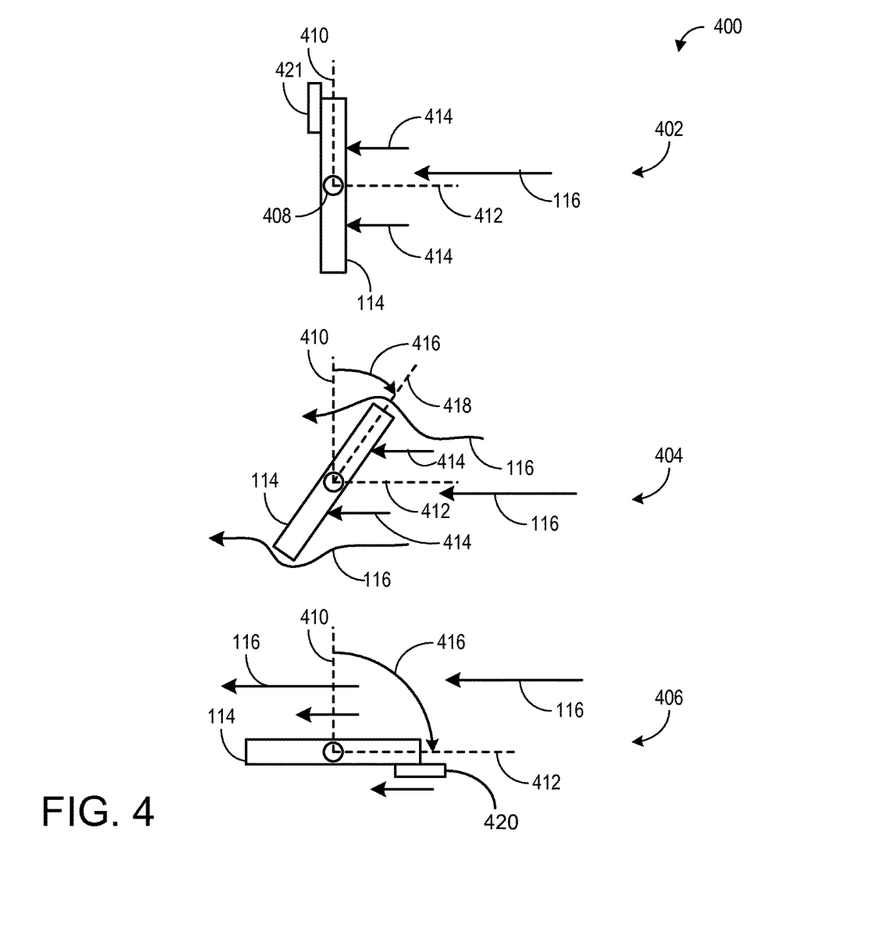
FIG. 4 shows a schematic of various vane positions of the active grille shutter system of FIG. 3.
Figure 5:
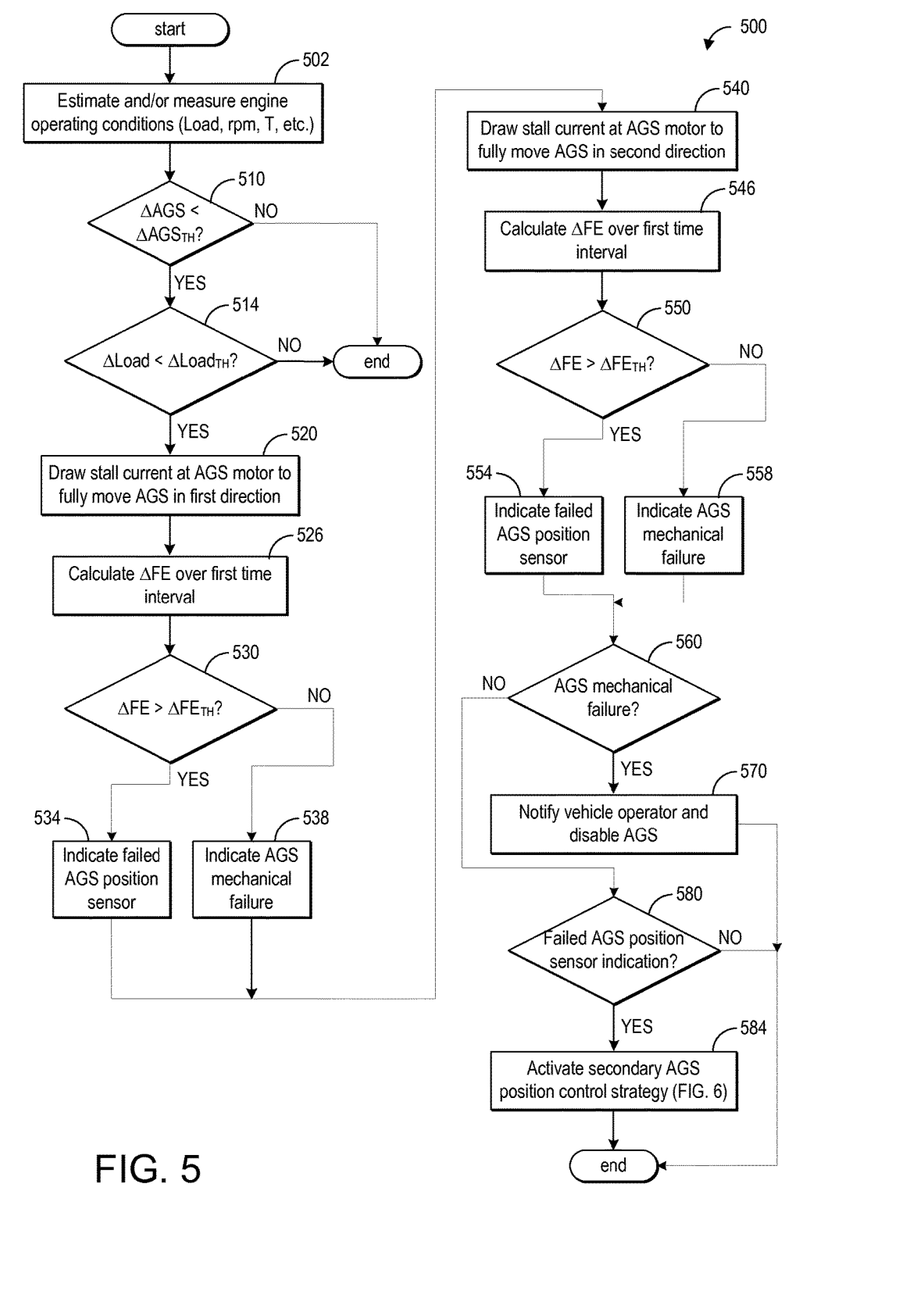
FIGS. 5 and 6 show flow charts for an example method for operating an active grille shutter system.
Figure 6:
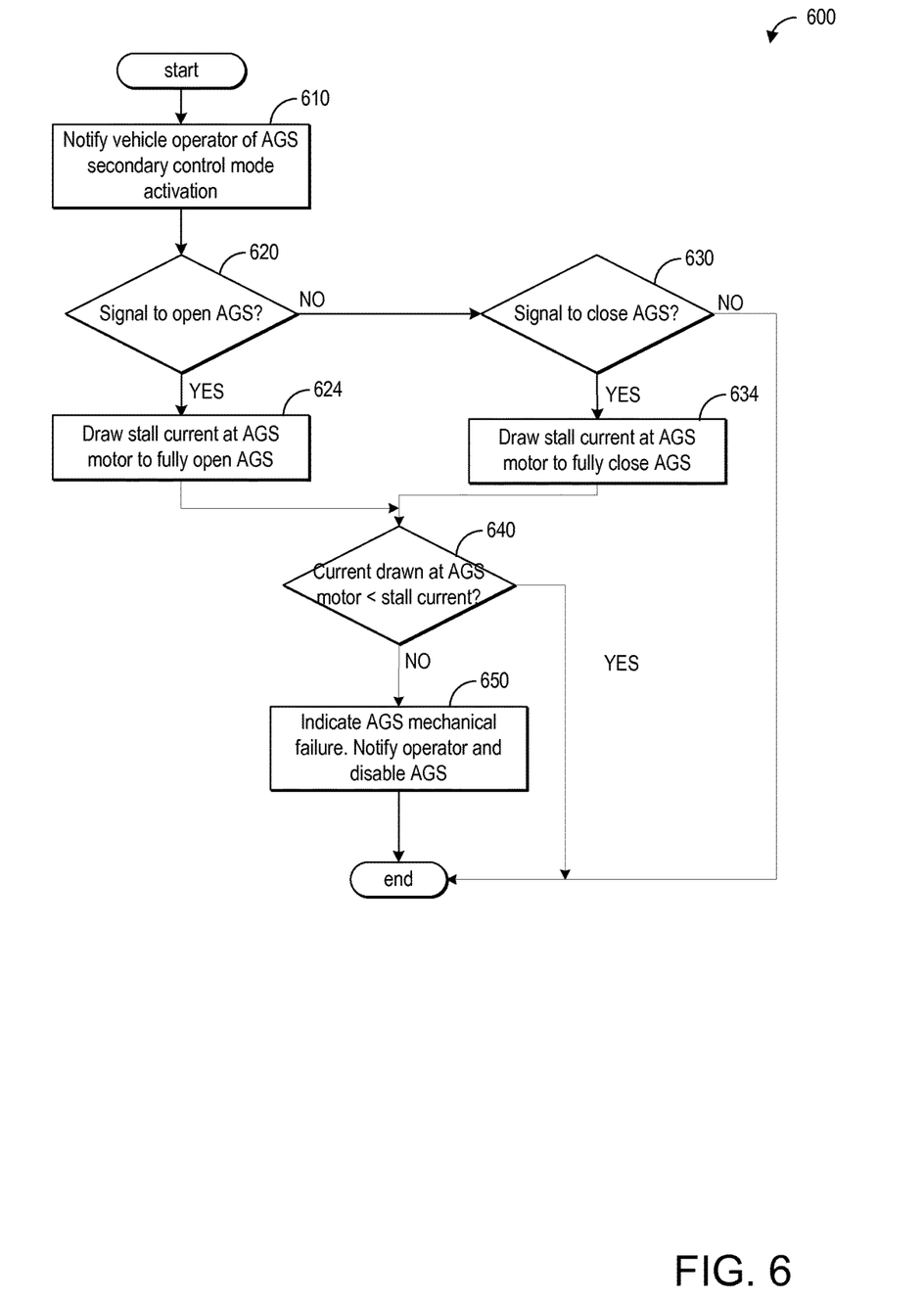
Figure 7:
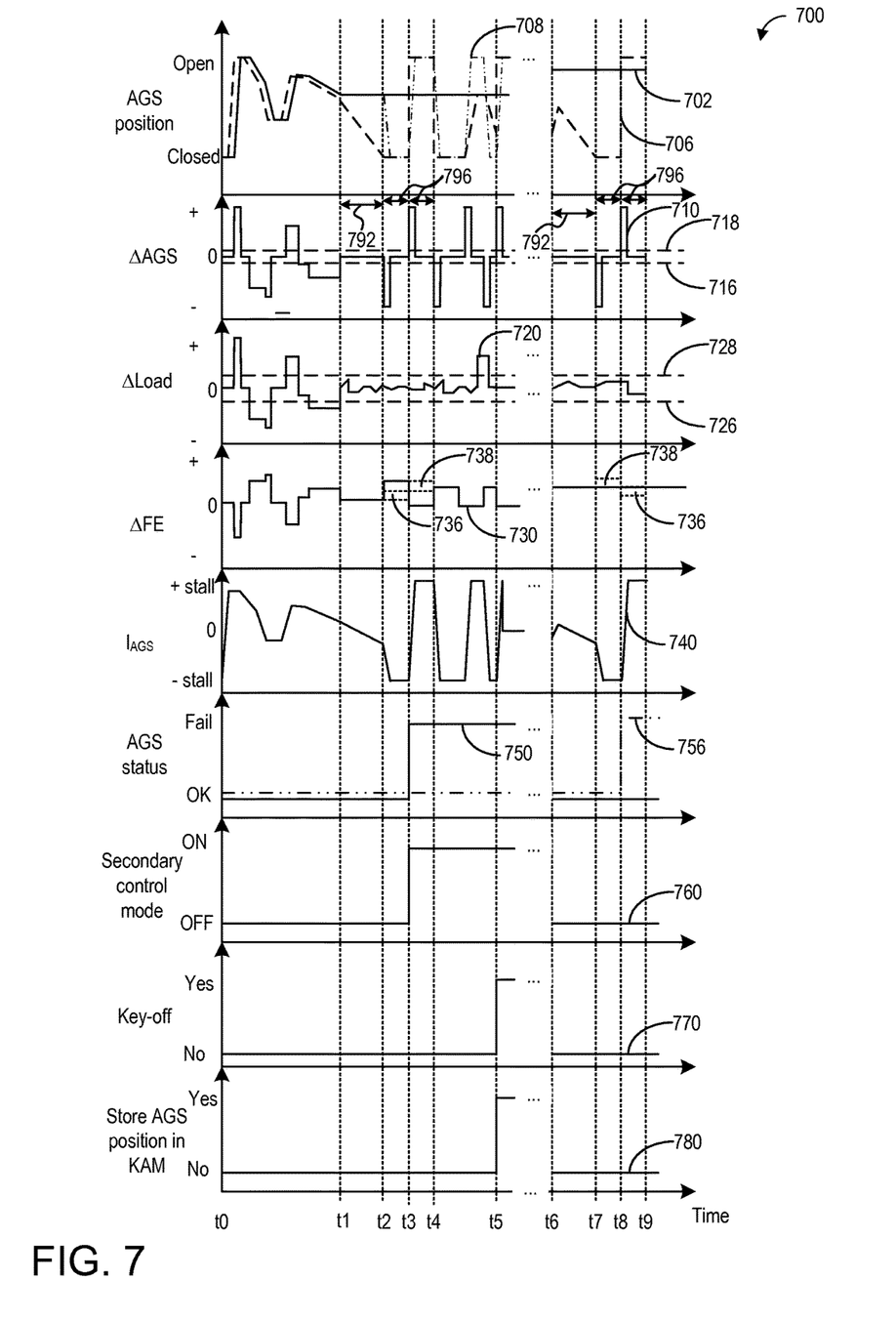
FIG. 7 shows an example timeline for operating a vehicle, including an active grille shutter system.

The following description relates to systems and methods for operating active grille shutters (AGS) of an engine system, such as the engine system shown in FIG. 1. Active grille shutters may be positioned at a grille of a front end of a vehicle, as shown at FIG. 2. A percentage opening of the AGS may be adjusted based on engine operating conditions in order to increase or decrease cooling airflow to the engine. Specifically, an engine controller may command an active grille shutter position via a motor coupled to the AGS, such as the motor shown in FIG. 3. The motor may then adjust the AGS into the commanded position. Different grille shutter positions are shown at FIG. 4 with respect to an opening angle of the AGS. In one example, the controller may increase the opening of the AGS to increase cooling airflow to the engine. However, additional engine operating conditions may result in a decrease in AGS opening in order to increase fuel economy. A method for operating an AGS system, including differentiating and responding to AGS position sensor and mechanical AGS degradations, is shown in FIGS. 5 and 6, and an example timeline for operating a vehicle system including an AGS system is shown in FIG. 7.

Turning now to FIG. 1, it shows a schematic of an example vehicle system 102, including an AGS system 110 and an engine system 100. Engine system 100 may be included in a vehicle such as a road vehicle, among other types of vehicles. While the example applications of engine system 100 will be described with reference to a vehicle, it should be appreciated that various types of engines and vehicle propulsion systems may be used, including passenger cars, trucks, and the like.

As shown in the example engine system 100 of FIG. 1, engine 10 is a boosted engine coupled to a turbocharger 13 including a compressor 14 driven by a turbine 16. Specifically, fresh air is introduced at intake passage 42 into engine 10 via air cleaner 11 and compressor 14. The compressor may be a suitable intake air compressor, such as a motor-driven or driveshaft driven supercharger compressor. In the engine system 100, the compressor 14 is shown as a turbocharger compressor mechanically coupled to turbine 16 via a shaft 19, the turbine 16 driven by expanding engine exhaust. In one embodiment, the compressor 14 and turbine 16 may be coupled within a twin scroll turbocharger. In another embodiment, the turbocharger 13 may be a variable geometry turbocharger (VGT), where turbine geometry is actively varied as a function of engine speed and other operating conditions.

As shown in FIG. 1, compressor 14 is coupled, through charge air cooler (CAC) 18 to throttle valve 20. The CAC may be an air-to-air or air-to-water heat exchanger, for example. Throttle valve 20 is coupled to engine intake manifold 22. From the compressor 14, the hot compressed air charge enters the inlet of the CAC 18, cools as it travels through the CAC, and then exits to pass through the throttle valve 20 to the engine intake manifold 22. Ambient airflow 116 from outside the vehicle may enter engine 10 through a grille 112 at a vehicle front end and pass across the CAC 18, to aid in cooling the charge air. Condensate may form and accumulate in the CAC 18 when the ambient air temperature decreases, or during humid or rainy weather conditions, where the charge air is cooled below the water dew point. When the charge air includes recirculated exhaust gases, the condensate can become acidic and corrode the CAC housing. The corrosion can lead to leaks between the air charge, the atmosphere, and possibly the coolant in the case of water-to-air coolers. Additionally, condensate may collect at the bottom of the CAC 18, and then be drawn into the engine at once during acceleration (or tip-in) increasing the chance of engine misfire. In one example, cooling of ambient airflow traveling to the CAC 18 may be controlled by the AGS system 110 such that condensate formation and engine misfire events are reduced.

In the embodiment shown in FIG. 1, the pressure of the air charge within the engine intake manifold 22 is sensed by manifold air pressure (MAP) sensor 24 and a boost pressure is sensed by boost pressure sensor 124. A compressor by-pass valve (not shown) may be coupled in series between the inlet and the outlet of compressor 14. The compressor by-pass valve may be a normally closed valve configured to open under selected operating conditions to relieve excess boost pressure. For example, the compressor by-pass valve may be opened during conditions of decreasing engine speed to avert compressor surge.

Engine intake manifold 22 is coupled to a series of combustion chambers 31 through a series of intake valves (not shown). The combustion chambers 31 are further coupled to exhaust manifold 36 via a series of exhaust valves (not shown). In the depicted embodiment, a single exhaust manifold 36 is shown. However, in other embodiments, the exhaust manifold 36 may include a plurality of exhaust manifold sections. Configurations having a plurality of exhaust manifold section may enable effluent from different combustion chambers to be directed to different locations in the engine system. Universal Exhaust Gas Oxygen (UEGO) sensor 126 is shown coupled to exhaust manifold 36 upstream of turbine 16. Alternatively, a two-state exhaust gas oxygen sensor may be substituted for UEGO sensor 126.

As shown in FIG. 1, exhaust from the one or more exhaust manifold sections is directed to turbine 16 to drive the turbine. When reduced turbine torque is desired, some exhaust may be directed instead through a waste gate (not shown), by-passing the turbine. The combined flow from the turbine and the waste gate then flows through emission control device 70. In general, the emission control device 70 may include a plurality of emission control devices such as one or more exhaust after-treatment catalysts configured to catalytically treat the exhaust flow, and thereby reduce an amount of one or more substances in the exhaust flow.

All or part of the treated exhaust from emission control device 70 may be released into the atmosphere via exhaust conduit 35. Depending on operating conditions, however, some exhaust may be diverted instead to EGR passage 51, through EGR cooler 50 and EGR valve 52, to the inlet of compressor 14. In this manner, the compressor is configured to admit exhaust tapped from downstream of turbine 16. The EGR valve 52 may be opened to admit a controlled amount of cooled exhaust gas to the compressor inlet for desirable combustion and emissions-control performance. In this way, engine system 100 is adapted to provide external, low-pressure (LP) EGR. The rotation of the compressor 14, in addition to the relatively long LP EGR flow path in engine system 100, may provide excellent homogenization of the exhaust gas into the intake air charge. Further, the disposition of EGR take-off and mixing points may provide more effective cooling of the exhaust gas for increased available EGR mass and enhanced performance. In other embodiments, the EGR system may be a high pressure EGR system with EGR passage 51 connecting from upstream of the turbine 16 to downstream of the compressor 14.

Motor vehicle 102 further includes a cooling system 104 that circulates coolant through internal combustion engine 10 to absorb waste heat and distributes the heated coolant to radiator 80 and/or heater core 90 via coolant lines 82 and 84, respectively. In particular, FIG. 1 shows cooling system 104 coupled to engine 10 and circulating engine coolant from engine 10 to radiator 80 via engine-driven water pump 86, and back to engine 10 via coolant line 82. Engine-driven water pump 86 may be coupled to the engine via front end accessory drive (FEAD) 88, and rotated proportionally to engine speed via a belt, chain, and the like. Specifically, engine-driven water pump 86 circulates coolant through passages in the engine block, engine head, and the like, to absorb engine heat, which is then transferred via the radiator 80 to ambient air. In an example where engine-driven water pump 86 is a centrifugal pump, the pressure (and resulting flow) produced at the engine-driven water pump outlet may be proportional to the crankshaft speed, which in the example of FIG. 1, is directly proportional to engine speed. In another example, a motor-controlled pump may be used that can be adjusted independently of engine rotation. The temperature of the coolant (e.g., engine coolant temperature, ECT) may be regulated by a thermostat valve 38, located in the cooling line 82, which may be kept closed until the coolant reaches a threshold temperature.

Engine system 100 may include an electric fan 92 for directing cooling airflow toward the CAC 18, engine cooling system 104, or other engine system components. In some embodiments, electric fan 92 may be an engine cooling fan. The engine cooling fan may be coupled to radiator 80 in order to maintain airflow through radiator 80 when vehicle 102 is moving slowly or stopped while the engine is running. Fan rotation speed or direction may be controlled by a controller 12. In one example, the engine cooling fan may also direct cooling airflow toward CAC 18. Alternatively, electric fan 92 may be coupled to the engine FEAD 88 and driven by the engine crankshaft. In other embodiments, electric fan 92 may act as a dedicated CAC fan. In this embodiment, the electric fan 92 may be coupled to the CAC 18 or placed in a location to direct airflow directly toward the CAC 18. In yet another embodiment, there may be two or more electric fans 92. For example, one may be coupled to the radiator (as shown) for engine cooling, while the other may be coupled elsewhere to direct cooling air directly toward the CAC 18. In this example, the two or more electric fans 92 may be controlled separately (e.g., at different rotation speeds) to provide cooling to their respective components.

Coolant may flow through coolant line 82, as described above, and/or through coolant line 84 to heater core 90 where the heat may be transferred via air ducts (not shown) to passenger compartment 106, and the coolant flows back to engine 10. In some examples, engine-driven water pump 86 may operate to circulate the coolant through both coolant lines 82 and 84.

FIG. 1 further shows a control system 28. Control system 28 may be communicatively coupled to various components of engine system 100 to carry out the control routines and actions described herein. For example, as shown in FIG. 1, control system 28 may include an electronic digital controller 12. Controller 12 may be a microcomputer, including a microprocessor unit, input/output ports, an electronic storage medium for executable programs and calibration values, random access memory (RAM), keep alive memory (KAM), and a data bus. As depicted, controller 12 may receive input from a plurality of sensors 30, which may include user inputs and/or sensors (such as transmission gear position, gas pedal input (e.g., pedal position), brake input, transmission selector position, vehicle speed, engine speed, mass airflow through the engine, boost pressure, ambient temperature, ambient humidity, intake air temperature, fan speed, and the like.), cooling system sensors (such as coolant temperature, fan speed, passenger compartment temperature, ambient humidity, and the like.), CAC 18 sensors (such as CAC inlet air temperature and pressure, CAC outlet air temperature and pressure, and the like.), one or more AGS position sensors 115, and other vehicle sensors. In addition, controller 12 may receive data from a GPS 34 and/or an in-vehicle communications and entertainment system 26 of vehicle 102.

The in-vehicle communications and entertainment system 26 may communicate with a wireless communication device 40 via various wireless protocols, such as wireless networks, cell tower transmissions, and/or combinations thereof. Data obtained from the in-vehicle communications and entertainment system 26 may include real-time and forecasted weather conditions. Weather conditions, such as temperature, precipitation (e.g., rain, snow, hail, etc.), and humidity, may be obtained through various wireless communication device applications and weather-forecasting websites. Data obtained from the in-vehicle communications and entertainment system 26 may include current and predicted weather conditions for the current location, as well as future locations along a planned travel route. In one embodiment, where the in-vehicle communications and entertainment system 26 includes a GPS 34, current and future weather data may be correlated with current and future travel routes displayed on the GPS 34. In an alternate embodiment, wherein the vehicle system includes a dedicated GPS 34, each of the GPS 34 and the in-vehicle communications and entertainment system 26 may communicate with the wireless communication device 40, as well as with each other, to communicate current and future weather data with current and future travel routes. In one example, the in-vehicle and communications entertainment system 26 may access various weather maps stored on the internet or other cloud computing systems. The stored weather maps may include rain, humidity, precipitation and/or temperature information provided as contour maps, for example. In one example, the wireless communication device 40 may relay real-time humidity data to the in-vehicle communications and entertainment system 26, and/or GPS 34, which is then relayed to the controller 12. The controller 12 may compare the received humidity data to threshold values and determine the appropriate engine operating parameter adjustments. In one example, these adjustments may include adjusting the AGS system 110. For example, if humidity is greater than a defined threshold, one or more vanes of the AGS may be closed.

In other embodiments, the presence of rain may be inferred from other signals or sensors (e.g., rain sensors). In one example, rain may be inferred from a vehicle windshield wiper on/off signal. Specially, in one example, when the windshield wipers are on, a signal may be sent to controller 12 to indicate rain. The controller may use this information to predict the likelihood of condensate formation in the CAC 18 and adjust one or more vehicle actuators, such as electric fan 92 and/or AGS system 110.

Furthermore, controller 12 may communicate with various actuators 32, which may include engine actuators (such as fuel injectors, an electronically controlled intake air throttle plate, spark plugs, and the like.), cooling system actuators (such as air handling vents and/or diverter valves in the passenger compartment climate control system, and the like.), AGS system actuators (such as AGS vanes, an AGS motor, and the like) and others. In some examples, the storage medium of controller 12 may be programmed with computer readable data representing instructions executable by the processor for performing the methods described below as well as other variants that are anticipated but not specifically listed.

As noted herein, the amount of waste heat transferred to the coolant from the engine 10 may vary with vehicle operating conditions, thereby affecting the amount of heat transferred to the air flowing through the engine system 100. For example, as engine output torque, or fuel flow, is reduced, the amount of waste heat generated may be proportionally reduced.

Motor vehicle 102 further includes a grille 112 providing an opening (e.g., a grille opening, a bumper opening, and the like.) for receiving ambient airflow 116 through or near the front end of the vehicle and into the engine compartment. Heat may be transferred to ambient airflow 116 via radiator 80, electric fan 92, and other components to keep the engine 10 and/or transmission cool. Further, the ambient airflow 116 may reject heat from the vehicle air conditioning system and can improve performance of turbo-charged/supercharged engines that are equipped with a CAC 18 that reduces the temperature of the air that goes into the intake manifold/engine. In one example, the electric fan 92 may be adjusted to further increase or decrease the airflow to the engine components. In another example, a dedicated CAC fan may be included in the engine system 100 for increasing or decreasing airflow to the CAC 18.

Turning now to FIG. 2, it shows partial schematic of a vehicle system 102 of FIG. 1, including the CAC 18, radiator 80, electric fan 92, engine system 100, AGS system 110, and associated ambient airflow 116 passing therethrough. Other under hood components (fuel system, batteries, and the like.) may benefit from the cooling airflow as well. Thus, AGS system 110 may assist cooling system 104 in cooling internal combustion engine 10. In the example shown in FIG. 2, AGS system 110 may be a dual active grille shutter system comprising two groups of one or more grille shutters 114 configured to adjust the amount of airflow received through grille 112. In another example, the AGS system 110 may be an active grille shutter system comprising a single group of one or more grille shutters 114.

Grille shutters 114 may cover a front region of the vehicle spanning from just below the hood to the bottom of the bumper, for example. By covering the vehicle front end, drag may be reduced and entry of external cooling air to the radiator 80 and CAC 18 may be reduced. In some embodiments, all grille shutters 114 may be moved in coordination by the controller 12. In other embodiments, grille shutters 114 may be divided into groups and the controller 12 may adjust opening/closing of each group of grille shutters 114 independently. For example, a first group of grille shutters 204 may be positioned in front of the radiator 80 and a second group of grille shutters 206 may be positioned in front of the CAC 18.

AGS system may include one or more AGS position sensors 115 located in close proximity to the grille shutters 114. In one example, at least one AGS position sensor 115 may be located in close proximity to each group of grille shutters 114. For example, at least one AGS position sensor 115 may be positioned in close proximity to each of the first group of grille shutters 204 and the second group of grille shutters 206. As another example, the AGS position sensor 115 may be arranged in close proximity to an AGS motor 202. In one example, the AGS position sensor 115 may be a Hall effect sensor. A Hall effect sensor may include a transducer that varies its output voltage in response to a magnetic field such as a magnetic field produced by a rotating AGS motor 202. The AGS position sensors 115 may be calibrated in response to a key-on engine status. For example, the AGS may be automatically moved to a fully open position by the controller in response to a key-off engine status. Thus, at key-on, the AGS position sensors may be calibrated to correspond to a fully open position, and subsequent control actions to change the AGS position via the AGS motor 202 may be made relative to the key-on calibration position.

As shown in FIG. 2, the first group of grille shutters 204 may be positioned vertically above, with respect to a surface on which vehicle 102 sits, the second group of grille shutters 206. As such, the first group of grille shutters 204 may be referred to as the upper grille shutters and the second group of grille shutters 206 may be referred to as the lower grille shutters. An amount of opening of the first group of grille shutters 204 may control an amount of ambient airflow 216 directed to the radiator 80 and an amount of opening of the second group of grille shutters 206 may control an amount of ambient airflow directed to the CAC 18. As such, the upper grille shutters may largely affect vehicle drag and engine cooling while the lower grille shutters may largely affect CAC cooling.

In some examples, each group of grille shutters 114 may contain the same number of grille shutters 114, while in other examples one group of grille shutters may contain a greater number of grille shutters than the other group. In one embodiment, the first group of grille shutters 204 may contain multiple grille shutters, while the second group of grille shutters 206 contains one grille shutter. In an alternate embodiment, the first group of grille shutters may only contain one grille shutter, while the second group of grille shutters contains multiple grille shutters. In alternate embodiments, all the grille shutters 114 may be included in a single group of grille shutters and an amount of opening of the single group of grille shutters 114 may affect vehicle drag, engine cooling, and CAC cooling.

Grille shutters 114 may be positioned between fully open position and a fully closed position, and may be maintained at the fully open position, the fully closed position, or a plurality of intermediate positions therebetween. In other words, opening of grille shutters 114 may be adjusted such that grille shutters 114 are opened partially, closed partially, or cycled between a fully open position and a fully closed position to provide airflow for cooling engine system components. The fully open position may be referred to as a maximal amount of opening (or maximal percentage opening) position and the fully closed position may be referred to as a maximal amount of closing (or maximal percentage closed) position. An amount of opening of the grille shutters 114 or group of grille shutters (e.g., first group of grille shutters 204 or second group of grille shutters 206) may be denoted by a percentage (e.g., percentage opening). For example, when the AGS are halfway between an opened and closed position, the AGS may be 50% open (or 50% closed). When the AGS are opened to the maximal percentage opening (e.g., an upper threshold amount of opening), the AGS may be 100% open.

The grille shutters 114 (e.g., upper grille shutters) may be actuated by an AGS motor 202. AGS motor 202 may be operatively coupled to the control system 28. As an example, controller 12 may be communicably connected to AGS system 110, and may have executable instructions stored thereon to adjust opening of grille shutters 114 via AGS motor 202. Controller 12 may send signals for adjusting the AGS system 110 to AGS motor 202. These signals may include commands to increase or decrease the opening of the upper and/or lower grille shutters. As an example controller 12 may output voltages to AGS motor that correspond to fully opening, fully closing, or partially opening the grille shutters 114. For example, controller 12 may output a voltage to the AGS motor 202 to open the upper grille shutters to 30% open. Correspondingly, the AGS motor 202 may draw an AGS motor current upon fully opening, fully closing, or partially opening the grille shutters 114. Furthermore, the controller 12 may detect or measure the AGS motor current to determine an AGS position. Further still, the output voltage to the AGS motor and the AGS motor current may be of a first polarity when rotating the AGS motor in a first direction (e.g., corresponding to opening the AGS grille shutters), and the output voltage to the AGS motor and the AGS motor current may be of a second polarity opposite to the first polarity when rotating the AGS motor in a second direction opposite to the first direction (e.g., corresponding to closing the AGS grille shutters).

AGS motor 202 may be coupled to one or more grille shutters 114. For example, AGS motor 202 may be coupled to a first grille shutter 114, the first grille shutter mechanically linked to the remaining grille shutters 114. In another example, AGS motor 202 may be coupled to each grille shutter 114 or each group of grille shutters. Further, in some examples, the AGS system 110 may include more than one motor for controller more than one group or more than one individual grille shutter.

Figure 3:
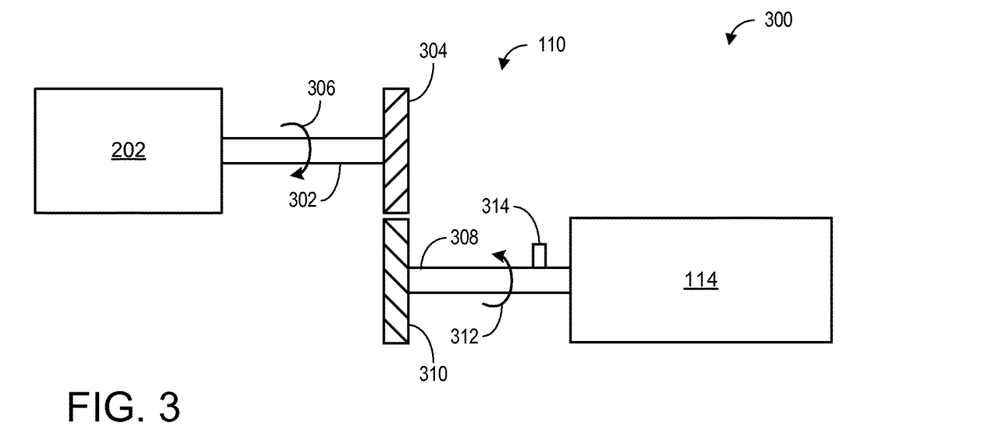
FIG. 3 shows a partial schematic of the active grille shutter system of FIGS. 1 and 2.

FIG. 3 shows a schematic 300 of the AGS system 110 including the AGS motor 202 and a single grille shutter 114 that may be one of a group of grille shutters. Specifically, schematic 300 shows the AGS motor 202 indirectly coupled to the grille shutter 114 through a series of shafts and gears.

The AGS motor 202 is coupled to a rotatable first shaft 302 at a first end of the first shaft 302. A second end of the first shaft 302 is coupled to a first gear 304. As the first shaft 302 rotates in a direction shown by arrow 306, the first gear 304 rotates in the same direction. As such, the first shaft 302 and the first gear 304 rotate together about a central axis of the first shaft 302. Further, the AGS motor 202 may actuate the first shaft 302 to rotate into a plurality of positions.

The individual grille shutter 114 may be referred to as a vane. Schematic 300 shows a front view of the grille shutter 114 (with respect to the vehicle front end). As such, airflow from outside of the vehicle may be directed into a plane of the figure. The grille shutter 114 may be coupled to a second shaft 308 at a first end of the second shaft 308. A second end of the second shaft 308 is coupled to a second gear 310. The first gear 304 interfaces with the second gear 310 such that rotation of the first gear 304 causes rotation of the second gear 310. Specifically, the first gear 304 may include a plurality of teeth offset from a plurality of teeth of the second gear 310. As such, the teeth of the first gear 304 may fit or mesh between teeth of the second gear 310 and teeth of the second gear 310 may mesh or fit between teeth of the first gear 304. As shown in the schematic 300, as the first gear 304 rotates in a first direction shown by arrow 306, the second gear may be rotatably driven in a second direction shown by arrow 312. The second direction is opposite the first direction. As a result of rotating the first shaft 302, the grille shutter 114 rotates with the rotation of the second gear 310 and the second shaft 308.

In alternate embodiments, the AGS system 110 shown in FIG. 3 may have additional gears and/or shafts coupling the AGS motor 202 to the grille shutter 114. Further, additional mechanical components may be included (in addition to those shown in FIG. 3) in the AGS system 110 in order to translate movement of the AGS motor 202 into coordinated movement and rotation of the grille shutter 114.

In one example, the AGS motor 202 may be a stepper motor. As such, the AGS motor 202 may rotate the first shaft 302 into a finite number of positions. Further, the AGS motor 202 may rotate the first shaft 302 in stepped threshold amounts with each actuation. For example, the stepped threshold amount of the AGS motor 202 may comprise six degree increments. In another example, the AGS motor 202 may move in a different number of degree increments. Further, the AGS motor 202 may have a finite number of motor positions. As a result, a desired grille shutter position may not align with an actual resulting grille shutter position after moving the AGS with the AGS motor 202. The AGS motor 202 may instead move the AGS to the closest available position to the commanded grille shutter position.

Upon receiving a command from a controller, the AGS motor 202 rotates the first shaft 302 into a position corresponding to the commanded grille shutter position. In one example, the command from the control may comprise moving the AGS motor 202 to a motor position translated from a commanded grille shutter position. In another example, the command may comprise a grille shutter position corresponding to a desired AGS motor position. The commanded grille shutter position may be a percentage opening (or closing) or an opening angle (e.g., opening degree). For example, 0% open may correspond to a grille shutter angle of 0 degrees, measured from a vertical axis of the grille shutter, as shown at FIG. 4 and explained further below. As discussed above, the commanded grille shutter position may not correspond exactly with each motor position. Thus, the AGS motor 202 may actuate the grille shutter 114 into the position closest to the commanded position.

Though the AGS motor 202 is shown coupled to a single grille shutter 114 in FIG. 4, in some embodiments the AGS motor 202 may be coupled to additional grille shutters. Further, the grille shutter 114 shown in FIG. 4 may be mechanically linked (e.g., via a linkage) to additional grille shutters positioned vertically above and/or below the grille shutter 114. As such, rotating the grille shutter 114 shown in FIG. 4 may rotate the other linked grille shutters by the same amount. In this way, the AGS motor 202 may adjust multiple grille shutters 114 or groups of grille shutters together and in parallel with one another.

One or a plurality of AGS position sensors 314 may be arranged at the AGS system 110 to provide feedback of an actual grille shutter vane position to a controller (such as controller 12 shown in FIG. 1). As shown in FIG. 4, the position sensor 314 is positioned along the second shaft 308 closer to the end of the second shaft 308 coupled to the grille shutter 114. However, in alternate embodiments, the AGS position sensor 314 may be positioned at a different position on the second shaft 308, first shaft 302, or grille shutter 114. The output of the position sensor 314 may be used in a feedback control strategy of control system 28 for controlling the AGS position.

In some cases, the feedback position of the AGS may be different than the commanded position, thereby resulting in a position error. As discussed above, the actual grille shutter vane position may be different than the commanded grille shutter van position due to the available motor increments not matching exactly with the desired vane angle. Additionally, position error may result from gear lash. As discussed above, the first gear 304 and the second gear 310 may mesh and interface together so that the first gear 304 may rotatably drive the second gear 310 as AGS motor rotatably drives the first shaft 302. In some examples, the teeth of the first or second gears may be slightly smaller than the space between the teeth of the second or first gear, respectively. As a result, when the two gears interface together, there may be gaps or spaces between the interfacing teeth of the two gears. This space or gap between the interfacing teeth may allow some slip or play in the gears. For example, if interfacing teeth are not positioned against one another when a first of the two gears begins to move, the teeth of the first gear may travel a distance before contacting the interfacing teeth of the second gear and subsequently beginning to move the second gear. Thus, the first gear may rotate a first amount before the second gear begins to rotate. As a result, the grille shutter 114 may move the target amount minus the first amount, thereby resulting in a position different than the commanded position.

Gear lash may occur to a greater degree when changing a direction of travel of the grille shutters 114. For example, gear lash may occur when transitioning from opening to closing or from closing to opening the AGS. In some examples, an allowable position error range, or tolerance band, may be defined such that position errors within the allowable position error range may not result in indicating grille shutter degradation and/or recalibrating the AGS system 110.

Turning now to FIG. 4, it shows example grille shutter positions for a single grille shutter 114. Specifically, schematic 400 shows a side view of a grille shutter 114 (such as the grille shutter 114 shown in FIG. 3). The grille shutter 114 may rotate about a central axis of the vane and the second shaft 308, as shown in FIG. 3. Schematic 400 shows a rotation point 408 of the grille shutter 114. The grille shutter

114 may rotate between a fully closed to a fully open position defined by a vertical axis 410 and lateral axis 412 of the AGS, respectively.

A first grille shutter position is shown at 402. The first grille shutter position is a fully closed position in which the AGS are fully closed, thereby preventing airflow from entering the vehicle through the grille. The percentage opening when the AGS are fully closed may be 0%, and the percent closing when the AGS are fully closed may be 100%. The grille shutter 114 is aligned with the vertical axis 410 such that an angle between the grille shutter 114 and the vertical axis 410 may be approximately 0° (vane axis 418 is parallel with the vertical axis 410). This angle may be referred to as the opening angle. In other embodiments, the fully closed grille shutter position may be slightly larger than 0° (e.g., 5°) to allow for overlapping of adjacent grille shutters. A force 414 may act on an outside face of the grille shutter 114, the force 414 resulting from air flow pushing against the vane as a vehicle (in which the AGS are installed) travels in a forward direction. Consequently, the force 414 may increase as the speed of the vehicle (vehicle speed, VS) increases.

Further, upon reaching the fully closed position (e.g., maximal percentage closing of 100% (and percentage opening of 0%), the grille shutter 114 may contact an end stop 421. The end stop 421 may be coupled to a support structure (e.g., an outer frame) of the AGS system 110. For example, the end stop 421 may be positioned along a vertical axis 410 of at least one grille shutter 114 of a group of grille shutters. As such, at least one grille shutter 114 of the group of grille shutters may contact the end stop 421 upon reaching the maximal percentage closing position of 100%. In response to the grille shutter 114 contacting the end stop 421, the AGS motor may stall and draw a stall current. The stall current may correspond to a maximal current drawn by an AGS motor under conditions where the motor is stalled (prevented from rotating by the end stop 421). Stalling the AGS motor may correspond to a condition when the AGS motor stops rotating and may occur when the load torque is greater than the motor shaft torque. In this condition the AGS motor may draw a stall current but the motor does not rotate. The stall current may be sensed by the control system 28, and thus, upon detecting the stall current the controller may determine that the AGS are fully open (e.g., at the maximal percentage opening).

A second grille shutter position is shown at 404. The second grille shutter position is an intermediate position between a fully open and a fully closed position in which the grille shutter 114 may be partially open (or partially closed). The opening angle 416 is defined between the vertical axis 410 and a vane axis 418 of the grille shutter 114. In one example, the opening angle 416 may be approximately 36° such that the percentage opening of the AGS is approximately 40%. In another example, the opening angle may be approximately 9° such that the percentage opening of the AGS is approximately 10%. In some cases, the controller may also determine a percentage closing of the AGS. For example, the percentage closing of the AGS may be calculated as 100 minus the percentage opening. In the example of the percentage opening being 40%, the percentage closing is 60%. The partially open grille shutter 114 allows ambient airflow 116 to flow around the vane, through the opening created by the partially open grille shutter 114, and into the vehicle and toward the engine. The resulting pressure from the force 414 acting on the grille shutter 114 may decrease as the percentage opening and opening angle 416 increases.

A third example grille shutter position is shown at 406. The third grille shutter position is a fully open position, thereby allowing maximal ambient airflow 116 to enter the vehicle and engine compartment through the grille. Thus, the fully open position may be referred to herein as a maximal opening or maximal percentage opening. When the AGS are fully open, the opening angle 416 is approximately 90° (vane axis 418 is parallel with the lateral axis 412) and the percentage opening is 100%. The force 414 on the grille shutter 114 may be much smaller since the vanes are fully open. Further, upon reaching the maximal percentage opening of 100% (and an opening angle of 90°), the grille shutter 114 may contact an end stop 420. The end stop 420 may be coupled to a support structure (e.g., an outer frame) of the AGS system 110. For example, the end stop 420 may be positioned along a lateral axis of at least one grille shutter 114 of a group of grille shutters. As such, at least one grille shutter 114 of the group of grille shutters may contact the end stop 420 upon reaching the maximal percentage opening of 100%. In response to the grille shutter 114 contacting the end stop, the AGS motor may stall and draw a stall current. The stall current may correspond to a maximal current drawn by an AGS motor under conditions where the motor is stalled (prevented from rotating by the end stop 420). The stall current may be sensed by the control system 28, and thus, upon detecting the stall current the controller may determine that the AGS 114 are fully open (e.g., at the maximal percentage opening). In one example, the stall current drawn by the AGS motor 202 when the grille shutters are fully open may be approximately equal in magnitude but opposite in polarity to the stall current drawn by the AGS motor 202 when the grille shutters are fully closed. Similarly, the voltage output by controller 12 to the AGS motor 202 to fully open the grille shutters 114 may be approximately equal in magnitude but opposite in polarity to the voltage output by controller 12 to the AGS motor 202 to fully close the grille shutters 114.

In this way, grille shutter vanes 114 of a AGS system 110 may be adjusted into a plurality of positions between 0% open (fully closed position) and 100% open (maximal percentage opening or fully open position). A motor may actuate the AGS 114 into different positions based on a commanded grille shutter position.

During normal operation, AGS may be fully open when the engine is off. When starting a cold engine, the controller 12 may command the AGS to remain closed for a duration to allow for the engine to warm and reach efficient operating temperatures more quickly, which can aid in reducing fuel consumption and engine emissions. Controller 12 may also command the AGS to close to block airflow through the grille when the engine is cool and engine loads are low, which can aid in reducing vehicle drag and fuel consumption. The AGS may also be closed at higher vehicle speeds, especially during constant cruising speeds and low engine loads, to reduce fuel consumption. When the engine temperature is to be lowered, the AGS may be commanded open by controller 12. The AGS control may also be used to aid in controlling engine coolant temperatures, HVAC performance, and exhaust emissions, depending on vehicle speed, engine load, and the like.

During vehicle operation, various means of AGS degradation can occur. The AGS grille shutters 114 may become stuck due to mechanical faults or foreign debris entering the front vehicle grille 112. The mechanical linkages between the AGS motor 202 and the grille shutters 114 may degrade or become worn or damaged with time. For example, the gears may become worn so that the gaps between interfacing teeth of opposing first and second gears 304 and 310, respectively, become larger such that the first gear 304 slips over (and fails to drive rotation of) the second gear 310. The AGS motor 202 may also experience mechanical degradation or may continue to function without a load in the presence of degraded mechanical linkages with the grille shutters 114.

In addition to AGS mechanical type degradations and faults, AGS position sensors 115 may be degraded or may malfunction due to damage or contamination from the environment. As described above, the AGS system 110 may include AGS position sensors 115. As an example, AGS position sensors 115 may comprise Hall Effect sensors and may be used to determine AGS position in an AGS position feedback control strategy. If the AGS position sensors lose functionality, the AGS feedback control strategy can no longer determine the grille shutter position directly from the AGS position sensors.

The controller 12 may indicate degradation of the AGS if a position error of the AGS is above a threshold error. Position error over the threshold error may also result in recalibration of the grille shutter position. The position error may be determined based on a difference between a commanded grille shutter position and a feedback (e.g., actual) grille shutter position as indicated by a position feedback sensor (e.g., AGS position sensor 314 or AGS position sensors 115 shown in FIG. 3). Position error may result from an AGS mechanical degradation and/or an AGS sensor degradation. For example, when AGS position sensors degrade, the AGS may still be mechanically operable. The ability to infer or determine AGS position by an alternate method (e.g., alternate to using AGS position sensors) when AGS position sensors degrade may allow for at least partial continued operation of the AGS. For example, if the AGS may still be fully opened and fully closed, at least a portion of the reductions in fuel economy conferred through operation of the AGS system 110 may be preserved. Conversely, in the event of a mechanical AGS degradation, even though the AGS position sensors 115 may correctly determine the AGS position, control of the AGS may be lost and the AGS system may be disabled to avoid engine overheating and to prevent AGS motor burnout or other damage to the AGS system.

In this manner, a vehicle system may comprise: an engine; active grille shutters (AGS), including an AGS position sensor and an AGS motor; and a controller, including executable instructions to, in response to an AGS position change being less than a threshold position change during a measurement period, actuate the AGS motor to move the AGS to a more closed position until a stall current is drawn by the AGS motor; calculate a fuel economy increase over a first interval while the stall current is drawn by the AGS motor; and determine a degradation of the AGS position sensor based on the fuel economy increase being greater than a threshold fuel economy increase. Additionally or alternatively, the controller may comprise executable instructions to, in response to the AGS position change being less than the threshold position change during the measurement period, actuate the AGS motor to move the AGS to a more open position until the stall current is drawn by the AGS motor, calculate the fuel economy decrease over the first interval while the stall current is drawn by the AGS motor, and determine the degradation of the AGS sensor based on the fuel economy decrease being greater than a threshold fuel economy decrease over the first interval. Additionally or alternatively, the controller may comprise executable instructions to: in response to the degradation of the AGS position sensor, activate a secondary AGS position control mode comprising, actuating the AGS motor to move the AGS to the more open position until the stall current is drawn by the AGS motor to fully open the AGS, and actuating the AGS motor to move the AGS to a more closed position until the stall current is drawn by the AGS motor to fully close the AGS. Additionally or alternatively, the controller may comprise executable instructions to determine an AGS mechanical degradation based on the fuel economy increase being less than the threshold fuel economy increase over the first interval or based on the fuel economy decrease being less than the threshold fuel economy decrease over the first interval. Additionally or alternatively, the secondary AGS position control mode may comprise executable instructions to actuate the AGS motor to move the AGS to the more open position until the stall current is drawn by the AGS motor, in response to a key-off condition. Additionally or alternatively, the secondary AGS position control mode may comprise executable instructions to store an AGS position as being fully open in controller memory, in response to the key-off condition.

Turning now to FIG. 5, it illustrates a method 500 of operating an AGS system, including a method for differentiating and responding to AGS position sensor degradations and AGS mechanical degradations. In other words, method 500 may comprise performing a type of rationality testing on the AGS system to ascertain if the AGS position sensors have degraded or if there is an AGS mechanical degradation. Method 500 may comprise executable instructions residing at a controller 12 onboard a vehicle. Method 500 begins at 502 where engine operating conditions such as load, engine speed (rpm), engine temperature (T), AGS position (AGS), fuel economy (FE), and the like are estimated and/or measured.

Method 500 continues at 510 where it determines if a change in the AGS position (RAGS), as measured by the AGS position sensors (e.g., AGS position sensors 115 and 314), is less than a threshold AGS position change ($\Delta AGS_{TH}$). In one example, $\Delta AGS$ may be determined over a specific measurement period, such as during a second time interval, and/or during certain prescribed engine operating conditions. The second time interval may comprise a duration of several minutes. In one example, the second time interval may include 10 minutes. The second time interval may be larger than the first time interval, as described below. $\Delta AGS_{TH}$ may correspond to a change in AGS position below which a lack of movement in the AGS is indicated. For example, $\Delta AGS_{TH}$ may be set according to a sensitivity of the AGS position sensors and/or a precision of the AGS motor and AGS system linkages such that if $\Delta AGS < \Delta AGS_{TH}$ the lack of movement in the AGS can be attributed to one or more types of AGS degradations. The measurement period may also include a period of steady (near constant) engine load, for example during steady state cruising on a highway or flat roads. Thus, if $\Delta AGS < \Delta AGS_{TH}$ during the measurement period (including the second time interval), indicating a lack of movement in the AGS by the AGS position sensors, method 500 may continue at 514 where it determines if a change in engine load ($\Delta Load$) is less than a threshold change in engine load ($\Delta Load_{TH}$). If $\Delta AGS$ is not less than $\Delta AGS_{TH}$ or if $\Delta Load$ is not less than $\Delta Load_{TH}$, method 500 ends.

If $\Delta Load < \Delta Load_{TH}$, method 500 continues at 520 where, in response to $\Delta AGS$ being less than $\Delta AGS_{TH}$ and/or $\Delta Load$ being less than $\Delta Load_{TH}$, the controller 12 stalls the AGS motor 202. Stalling the AGS motor 202 may comprise operating the AGS motor 202 to draw a stall current corresponding to fully moving the AGS in a first direction. In other words, controller 12 may actuate the AGS motor (e.g., output a voltage to the AGS motor 202) in a first direction to move the AGS 114 to a more closed position until a stall current is drawn by the AGS motor 202. For example, the AGS motor 202 may draw the stall current when the AGS 114 are fully closed against end stop 421. Alternately, controller 12 may actuate the AGS motor (e.g., output a voltage to the AGS motor 202) in a first direction to move the AGS 114 to a more open position until a stall current is drawn by the AGS motor 202. For example, the AGS motor 202 may draw the stall current when the AGS 114 are fully opened against end stop 420. In other words moving the AGS in the first direction may comprise either opening the AGS or closing the AGS. By stalling the AGS motor to move the AGS, method 500 at 520 temporarily overrides feedback control of the AGS position based on the AGS position sensors. Furthermore, if stalling the AGS motor and moving the AGS in the first direction corresponds to fully opening the AGS, method 500 may store that relationship in controller memory such as controller KAM. Conversely, if stalling the AGS motor and moving the AGS in the first direction corresponds to fully closing the AGS, method 500 may store that relationship in controller memory such as controller KAM.

After stalling the AGS motor 202, method 500 continues at 526 where it calculates a change in fuel economy change, $\Delta FE$, over a first time interval. In one example, the first time interval may comprise a few minutes. The first time interval may correspond to a time interval over which a reliably measure of a fuel economy change may be determined. The fuel economy change may correspond to a fuel economy increase or a fuel economy decrease over the first time interval, and may depend on whether stalling the AGS motor in the first direction comprises fully closing the AGS or fully opening the AGS. For example, stalling the AGS motor and fully closing the AGS may cause an increase in fuel economy since the vehicle drag is reduced and fuel consumption is reduced during the first interval and during the measurement period. On the other hand, stalling the AGS motor and fully opening the AGS may cause a decrease in fuel economy since the vehicle drag is increased and fuel consumption is increased during the first interval and during the measurement period.

Method 500 continues at 530 where it determines if the fuel economy change, $\Delta FE$, over the first time interval is greater than a threshold fuel economy change, $\Delta FE_{TH}$. $\Delta FE_{TH}$ may correspond to a threshold fuel economy increase if $\Delta FE$ corresponds to a fuel economy increase. Conversely, $\Delta FE_{TH}$ may correspond to a threshold fuel economy decrease if $\Delta FE$ corresponds to a fuel economy decrease. $\Delta FE_{TH}$ may correspond to a threshold fuel economy change above which movement in the AGS (either to a fully open or a fully closed position) is indicated. Thus, when $\Delta FE > \Delta FE_{TH}$, $\Delta FE$ can be used to infer the AGS position: if $\Delta FE > \Delta FE_{TH}$ corresponds to a fuel economy increase greater than a threshold fuel economy increase, then the AGS is fully closed, whereas if $\Delta FE > \Delta FE_{TH}$ corresponds to a fuel economy decrease greater than a threshold fuel economy decrease, then the AGS is fully opened.

Accordingly, $\Delta FE > \Delta FE_{TH}$ infers movement in the AGS position and functioning mechanical linkages in the AGS system. Thus, when $\Delta FE$ is not greater than $\Delta FE_{TH}$, method 500 indicates an AGS mechanical degradation at 538. Accordingly, if $\Delta FE > \Delta FE_{TH}$, method 500 continues to 534 where it indicates a degraded AGS position sensor. Thus, by stalling the AGS motor to move the AGS position to a fully open or fully closed position and comparing the resultant $\Delta FE$ to $\Delta FE_{TH}$ over the first time interval, method 500 can distinguish between an AGS mechanical degradation and an AGS position sensor degradation.

After 534 or 538, method 500 continues at 540 where it may stall the AGS motor 202. Stalling the AGS motor 202 may comprise operating the AGS motor 202 to draw a stall current corresponding to fully moving the AGS in a second direction opposite to the first direction. In other words, if fully moving the AGS in the first direction comprises fully opening the AGS, controller 12 may actuate the AGS motor (e.g., output a voltage to the AGS motor 202) in the second direction to move the AGS 114 to a more closed position until a stall current is drawn by the AGS motor 202. For example, the AGS motor 202 may draw the stall current when the AGS 114 are fully closed against end stop 421. Alternately, if fully moving the AGS in the first direction comprises fully closing the AGS, controller 12 may actuate the AGS motor (e.g., output a voltage to the AGS motor 202) in the second direction to move the AGS 114 to a more open position until a stall current is drawn by the AGS motor 202. For example, the AGS motor 202 may draw the stall current when the AGS 114 are fully opened against end stop 420. In other words moving the AGS in the second direction may comprise either opening the AGS or closing the AGS, corresponding to either closing the AGS or opening the AGS when moving the AGS in the first direction, respectively. By stalling the AGS motor to move the AGS in the second direction, method 500 at 540 temporarily overrides feedback control of the AGS position based on the AGS position sensors. Furthermore, if stalling the AGS motor and moving the AGS in the second direction corresponds to fully opening the AGS, method 500 may store that relationship in controller memory such as controller KAM. Conversely, if stalling the AGS motor and moving the AGS in the second direction corresponds to fully closing the AGS, method 500 may store that relationship in controller memory such as controller KAM.

After stalling the AGS motor 202 at 540, method 500 continues at 546 where it calculates a change in fuel economy change, $\Delta FE$, over a first time interval. In one example, the first time interval may comprise a few minutes. The first time interval may correspond to a time interval over which a reliably measure of a fuel economy change may be determined. The fuel economy change may correspond to a fuel economy increase or a fuel economy decrease over the first time interval, and may depend on whether stalling the AGS motor in the second direction comprises fully closing the AGS or fully opening the AGS. For example, stalling the AGS motor and fully closing the AGS may cause an increase in fuel economy since the vehicle drag is reduced and fuel consumption is reduced during the first interval and during the measurement period. On the other hand, stalling the AGS motor and fully opening the AGS may cause a decrease in fuel economy since the vehicle drag is increased and fuel consumption is increased during the first interval and during the measurement period.

Method 500 continues at 550 where it determines if the fuel economy change, $\Delta FE$, over the first time interval is greater than a threshold fuel economy change, $\Delta FE_{TH}$. $\Delta FE_{TH}$ may correspond to a threshold fuel economy increase if $\Delta FE$ corresponds to a fuel economy increase. Conversely, $\Delta FE_{TH}$ may correspond to a threshold fuel economy decrease if $\Delta FE$ corresponds to a fuel economy decrease. $\Delta FE_{TH}$ may correspond to a threshold fuel economy change above which movement in the AGS (either to a fully open or a fully closed position) is indicated. Thus, when $\Delta FE > \Delta FE_{TH}$, $\Delta FE$ can be used to infer the AGS position: if $\Delta FE > \Delta FE_{TH}$ corresponds to a fuel economy increase greater than a threshold fuel economy increase, then the AGS is fully closed, whereas if $\Delta FE > \Delta FE_{TH}$ corresponds to a fuel economy decrease greater than a threshold fuel economy decrease, then the AGS is fully opened.

Accordingly, $\Delta FE > \Delta FE_{TH}$ infers movement in the AGS position and functioning mechanical linkages in the AGS system. Thus, when $\Delta FE$ is not greater than $\Delta FE_{TH}$, method 500 indicates an AGS mechanical degradation at 558. Accordingly, if $\Delta FE > \Delta FE_{TH}$, method 500 continues to 554 where it indicates a degraded AGS position sensor. Thus, by stalling the AGS motor to move the AGS position to a fully open or fully closed position and comparing the resultant $\Delta FE$ to $\Delta FE_{TH}$ over the first time interval, method 500 can distinguish between an AGS mechanical degradation and an AGS position sensor degradation.

In one example, method 500 may diagnose an AGS position sensor degradation and/or an AGS mechanical degradation via steps 520 through 538 and via steps 540 through 558. In another example, method 500 may diagnose an AGS position sensor degradation and/or an AGS mechanical degradation via steps 520 through 538 and validate that diagnosis by executing steps 540 through 558. In another example, method 500 may diagnose an AGS position sensor degradation and/or an AGS mechanical degradation via steps 540 through 558 and validate that diagnosis by executing steps 520 through 538. In other examples, method 500 may diagnose an AGS position sensor degradation and/or an AGS mechanical degradation via either steps 520 through 538 or steps 540 through 558.

Method 500 continues at 560 where it determines if an AGS mechanical degradation has been indicated, for example, at step 538 and/or step 558. If an AGS mechanical degradation has been indicated, method 500 continues at 570 where the vehicle operator is notified and the AGS system is disabled. Disabling the AGS system may comprise maintaining the AGS in a partially open or fully open position. Notifying the vehicle operator may include supplying a visible warning lamp and/or audible alarm indicator at a vehicle operator panel indicating that the AGS system requires service.

If an AGS mechanical degradation has not been indicated at 560, method 500 continues at 580 where it determines if a degraded AGS position sensor has been indicated, for example at step 534 and/or step 554. If a degraded AGS position sensor has been indicated, method 500 continues to 584 where a secondary AGS position control strategy is activated (FIG. 6). If a degraded AGS position sensor has not been indicated at 580, method 500 ends.

Turning now to FIG. 6, it illustrates an example method 600 for executing a secondary AGS control mode. The secondary AGS control mode may be used to control opening and closing of the AGS when an AGS position sensor degradation occurs. As described above, the AGS position can be inferred by stalling the AGS motor to fully move the AGS in a first direction or a second direction corresponding to fully opening or closing the AGS. In this way, in the event of an AGS position sensor degradation, controller 12 may continue operating the AGS system and preserve at least some of the fuel reduction advantages conferred therefrom, until the AGS position sensor degradation is remedied. Method 600 may comprise executable instructions residing at a controller 12 onboard a vehicle. At 610, method 600 notifies the vehicle operator of the AGS second control mode activation. Notifying the vehicle operator may include supplying a visible warning lamp and/or audible alarm indicator at a vehicle operator panel indicating that the AGS secondary control mode has been activated.

At 620, method 600 determines if a signal from the controller 12 to open the AGS is received. For example, the controller 12 may output a signal to open the AGS when additional cooling to the engine is needed. As another non-limiting example, the controller 12 may output a signal to open the AGS after the engine is warmed following a cold key-on engine start. If a signal to open the AGS is received at 620, method 600 continues at 624 where the stall current is drawn at the AGS motor to fully open the AGS. The relationship between rotation direction (e.g., in the first direction or the second direction) of the AGS motor and the direction the AGS are moved (e.g., opening or closing) may be determined in method 500 in steps 520 through 530 and steps 540 through 550, and this relationship may be stored in controller KAM, as described above.

Returning to method 600 at 620, if a signal to open the AGS is not received, method 600 continues at 630 where it determines if a signal to close the AGS is received. For example, a signal to close the AGS may be received in response to a key-on engine condition when the engine temperature is cold to speed engine warm-up thereby reducing engine emissions and fuel consumption. As another example, a signal to close the AGS may be received at cruising vehicle speeds when the engine temperature is lower to reduce vehicle drag and lower fuel consumption. If a signal to close the AGS is received, method 600 continues at 634 where the stall current is drawn at the AGS motor to fully close the AGS. The relationship between rotation direction (e.g., in the first direction or the second direction) of the AGS motor and the direction the AGS are moved (e.g., opening or closing) may be determined in method 500 in steps 520 through 530 and steps 540 through 550, and this relationship may be stored in controller KAM, as described above.

Method 600 continues from 624 and 634 at 640 where it verifies if the stall current is drawn at the AGS motor 202. If the stall current is drawn at the AGS motor, method 600 ends. If the stall current is not drawn at the AGS motor, then method 600 continues at 650 where it may indicate an AGS mechanical degradation, notify the vehicle operator of the AGS mechanical degradation, and disable the AGS. In one example, if the mechanical linkages between the AGS motor and the AGS are damaged and uncoupled, the AGS may not be fully opened reaching end stop 420 or fully closed reaching end stop 421. In other words, the AGS motor may rotate freely and draw a free current less than the stall current corresponding to the power required to sustain rotation of the uncoupled AGS motor. Thus, the current drawn by the AGS motor may be less than the stall current, indicating an AGS mechanical degradation. In another example, in the case of debris becoming stuck in the AGS or another type of obstruction mechanical degradation hindering or preventing motion of the AGS, method 600 may determine a mechanical degradation based on a time duration before drawing stall current at the AGS motor. For example, if the duration is shorter than a predetermined threshold stall current duration, then a mechanical obstruction or other degradation of the AGS may be indicated since the AGS may become stuck before being fully opened or full closed due to the mechanical obstruction. The predetermined threshold stall current duration may be predetermined or calibrated based on the non-mechanically degraded operation of the AGS (e.g., the speed at which the AGS can move from fully open to fully closed). After 650, and after 630 if a signal to close the AGS is not received, method 600 ends.

In this manner, a method for a vehicle may comprise, during a first condition comprising when an active grille shutter (AGS) position change over a second interval is less than a threshold position change: stalling an AGS motor for a first interval; calculating a fuel economy change over the first interval; and determining a degradation of an AGS sensor based on the fuel economy change being greater than a threshold fuel economy change over the first interval.

Additionally or alternatively, the first condition may comprise when an engine load change over the second interval is less than a threshold engine load change. Additionally or alternatively, stalling the AGS motor may comprise the AGS motor drawing a stall current to fully close the AGS. Additionally or alternatively, the fuel economy change may comprise a fuel economy increase and the threshold fuel economy change comprises a threshold fuel economy increase. Additionally or alternatively, stalling the AGS motor may comprise the AGS motor drawing a stall current to fully open the AGS. Additionally or alternatively, the fuel economy change may comprise a fuel economy reduction and the threshold fuel economy change may comprise a threshold fuel economy reduction. Additionally or alternatively, the method may comprise determining an AGS mechanical degradation based on the fuel economy change being less than the threshold fuel economy change over the first interval. Additionally or alternatively, the method may comprise in response to a key-off condition, stalling the AGS motor to fully open the AGS.

In this manner, a method for a vehicle, executed by an onboard vehicle controller, may comprise: in response to an AGS position change being less than a threshold position change during a measurement period, actuating an AGS motor to move the AGS to a more closed position until a stall current is drawn by the AGS motor; calculating a fuel economy increase over a first interval while the stall current is drawn by the AGS motor; and determining a degradation in an AGS sensor based on the fuel economy increase being greater than a threshold fuel economy increase. Additionally or alternatively, the measurement period may comprise an interval during which an engine load condition is met. Additionally or alternatively, the vehicle engine load condition may comprise an engine load change over the measurement period being less than a threshold engine load change. Additionally or alternatively, the method may comprise: in response to an AGS position change being less than a threshold position change during the measurement period, actuating the AGS motor to move the AGS to a more open position until the stall current is drawn by the AGS motor; calculating a fuel economy decrease over the first interval while the stall current is drawn by the AGS motor; and determining the degradation of the AGS sensor based on the fuel economy decrease being greater than a threshold fuel economy decrease over the first interval. Additionally or alternatively, the method may comprise, in response to the degradation of the AGS position sensor, activating a secondary AGS position control mode comprising, actuating the AGS motor to move the AGS to the more open position until the stall current is drawn by the AGS motor to fully open the AGS, and actuating the AGS motor to move the AGS to the more closed position until the stall current is drawn by the AGS motor to fully close the AGS. Additionally or alternatively, the secondary AGS position control mode further comprises in response to a key-off engine condition, actuating the AGS motor to move the AGS to the more open position until the stall current is drawn by the AGS motor to fully open the AGS.

Turning now to FIG. 7, it illustrates an example timeline 700 for operating a vehicle, including an AGS system. Timeline 700 includes trend lines for AGS position 702, target AGS position 706, inferred AGS position 708, RAGS 710, ΔLoad 720, ΔFE 730, AGS motor current ($I_{AGS}$) 740, AGS position sensor status 750, AGS mechanical status 756, secondary control mode status 760, engine key-off status 770, and stored AGS position in KAM status 780. Timeline 700 also show dashed lines indicating upper bound 718 and lower bound 716 of $\Delta AGS_{TH}$, upper bound 728 and lower bound 726 of $\Delta Load_{TH}$, and upper bound 738 and lower bound 736 of $\Delta FE_{TH}$. Furthermore double arrows indicate a second time interval 792 and a first time interval 796. AGS position 702 may correspond to the AGS position as determined by AGS position sensors; the target AGS position 706 may refer to a set point AGS position as output by a AGS position feedback control strategy based on the AGS position 702; inferred AGS position 708 may correspond to the inferred AGS position based on ΔFE while drawing the stall current at the AGS motor. ΔAGS may correspond to a change in AGS position 702 when there is no AGS position sensor degradation, and may correspond to a change in inferred AGS position 708 when there is an AGS position sensor degradation.

Between time t0 and t1, the AGS status is OK (e.g., there are no AGS mechanical or AGS position sensor degradations), and the secondary AGS control mode is OFF. The AGS position is opened and closed in response to changes in engine load, ΔLoad. Furthermore, ΔAGS and ΔLoad regularly exceed the bounds of $\Delta AGS_{TH}$ and $\Delta Load_{TH}$ such that ΔAGS and ΔLoad do not remain within the bounds of $\Delta AGS_{TH}$ and $\Delta Load_{TH}$ for periods longer than a second time interval 792. As the AGS position is moved to a more open position or a more closed position, the current drawn by the AGS motor, $I_{AGS}$, fluctuates. In particular, when the AGS is fully opened or fully closed, $I_{AGS}$ may increase to a stall current value. In timeline 700, for illustration purposes, a +stall current is assigned to correspond to a stall current when the AGS position is fully opened and a −stall current is assigned to correspond to a stall current when the AGS position is fully closed. The +stall current may correspond to a stall current when the AGS is rotated in a first direction such that the AGS moves to a more open position to a fully opened position, whereas the −stall current may correspond to a stall current when the AGS is rotated in a second direction such that the AGS moves to a more closed position to a fully closed position. ΔFE may also be observed to be responsive to ΔAGS: ΔFE corresponding to an increase in fuel economy (e.g., lower fuel consumption) when the AGS are moved to a more closed position; ΔFE corresponding to a decrease in fuel economy (e.g., higher fuel consumption) when the AGS are moved to a more open position.

Between times t1 and t2, corresponding to a second time interval 792, the AGS position as determined by the AGS position sensor, remains constant, despite a change in the target AGS position 706. As a result, ΔAGS remains within the upper bound 718 and the lower bound 716 of $\Delta AGS_{TH}$ (e.g., $\Delta AGS < \Delta AGS_{TH}$). Furthermore, ΔLoad remains within the upper bound 728 and the lower bound 726 of $\Delta Load_{TH}$ (e.g., $\Delta Load < \Delta Load_{TH}$). As an example, ΔLoad may be less than $\Delta Load_{TH}$ during the second time interval 792 because the vehicle may be cruising at constant speed on a flat highway road.

Immediately after time, t2, in response to $\Delta AGS < \Delta AGS_{TH}$ over a measurement period comprising the second time interval 792 and ΔLoad<ΔLoad$_{TH}$ during the second time interval, the AGS motor may be stalled to aid in diagnosing an AGS degradation (e.g., an AGS position sensor degradation or an AGS mechanical degradation). Stalling the AGS motor may include outputting a voltage to the AGS motor inducing it to rotate in a first direction until a stall current is drawn by the AGS motor. In the example of timeline 700, rotating the AGS motor in the first direction corresponds to driving the AGS to move to a more closed position, until the AGS is fully closed (as shown by the inferred AGS position 708) and the stall current (e.g., −stall) is drawn by the AGS motor between times t2 and t3. Time t2 and time t3 may correspond to a start and end time of a first time interval 796. In response to fully closing the AGS, the fuel economy may increase, as shown by the step increase in ΔFE during the first interval 796 between times t2 and t3. The step increase in ΔFE between t2 and t3 is greater than the upper bound 738 of ΔFE$_{TH}$ indicating an AGS position sensor degradation. Between times t2 and t3, the AGS position 702 as indicated by the AGS position sensor remains constant due to the AGS position sensor degradation.

Accordingly, at time t3, the AGS position sensor degradation status 750 changes from OK to Fail, based on the fuel economy change being greater than a threshold fuel economy change during the first interval between times t2 and t3. Furthermore, a secondary AGS position control mode status 760 may be activated in response to the degradation of the AGS position sensor.

Also at time t3, the AGS system degradation diagnosis may be validated at time, t3, comprising: in response to ΔAGS<ΔAGS$_{TH}$ over a measurement period comprising the second time interval 792 and ΔLoad<ΔLoad$_{TH}$ during the second time interval, the AGS motor may be stalled to aid in diagnosing an AGS degradation (e.g., an AGS position sensor degradation or an AGS mechanical degradation). Stalling the AGS motor may include outputting a voltage to the AGS motor inducing it to rotate in a second direction opposite to the first direction until a stall current is drawn by the AGS motor. In the example of timeline 700, rotating the AGS motor in the second direction corresponds to driving the AGS to move to a more opened position, until the AGS is fully closed and the stall current (e.g., +stall) is drawn by the AGS motor between times t3 and t4 (as shown by the inferred AGS position 708). Time t3 and time t4 may correspond to a start and end time of another first time interval 796. In response to fully opening the AGS between times t3 and t4, the fuel economy may decrease, as shown by the step decrease in ΔFE during the first interval 796 between times t3 and t4. The step decrease in ΔFE between t3 and t4 exceeds the lower bound 736 of ΔFE$_{TH}$ indicating an AGS position sensor degradation. Between times t3 and t4, the AGS position 702 as indicated by the AGS position sensor remains constant due to the AGS position sensor degradation.

Accordingly, at time t4, the AGS position sensor degradation status 750 as Fail is verified, based on the fuel economy change being greater than a threshold fuel economy change during the first interval between times t3 and t4. Furthermore, a secondary AGS position control mode status 760 may remain activated in response to the degradation of the AGS position sensor.

Thus, between times t4 and t5, the secondary AGS position control mode is used to control the AGS position. When the target AGS position 706 is changed to a more closed position or a more open position, the secondary AGS position control mode stalls the AGS motor to move the inferred AGS position 708 to a fully closed or fully open position, respectively. Stalling the AGS motor to fully open or fully close may comprise drawing a stall current (+stall or −stall, respectively) at the AGS motor as shown by I$_{AGS}$ 740. Furthermore, as shown by ΔFE 730, despite the AGS position sensor degradation, fuel economy increases may still be preserved between times t4 and t5 through activation of the secondary AGS position control mode based on the inferred AGS position 708.

At time t5, the key-off engine status 770 is activated. In response, the secondary AGS control mode fully opens the AGS and the fully open AGS position is stored within the controller KAM (e.g, as shown by trend line 780).

Between times t6 and t7, corresponding to another second time interval 792, the AGS position as determined by the AGS position sensor, remains constant, despite a change in the target AGS position 706. As a result, ΔAGS remains within the upper bound 718 and the lower bound 716 of ΔAGS$_{TH}$ (e.g., ΔAGS<ΔAGS$_{TH}$). Furthermore, ΔLoad remains within the upper bound 728 and the lower bound 726 of ΔLoad$_{TH}$ (e.g., ΔLoad<ΔLoad$_{TH}$). As an example, ΔLoad may be less than ΔLoad$_{TH}$ during the second time interval 792 because the vehicle may be cruising at constant speed on a flat highway road.

Immediately after time, t7, in response to ΔAGS<ΔAGS$_{TH}$ over a measurement period comprising the second time interval 792 and ΔLoad<ΔLoad$_{TH}$ during the second time interval, the AGS motor may be stalled to aid in diagnosing an AGS degradation (e.g., an AGS position sensor degradation or an AGS mechanical degradation). Stalling the AGS motor may include outputting a voltage to the AGS motor inducing it to rotate in a first direction until a stall current is drawn by the AGS motor. In the example of timeline 700, rotating the AGS motor in the first direction corresponds to driving the AGS to move to a more closed position, until the AGS is fully closed and the stall current (e.g., −stall) is drawn by the AGS motor between times t7 and t8. Times t7 and time t8 may correspond to a start and end time of a first time interval 796. Between times t7 and t8, there is no change in fuel economy (ΔFE remains constant), indicating a lack of movement of the AGS, and indicating an AGS mechanical degradation. Accordingly, at time t8, the AGS mechanical degradation status changes to Fail.

After time, t8, in response to ΔAGS<ΔAGS$_{TH}$ over a measurement period comprising the second time interval 792 and ΔLoad<ΔLoad$_{TH}$ during the second time interval, the AGS motor may be stalled to aid in diagnosing an AGS degradation (e.g., an AGS position sensor degradation or an AGS mechanical degradation). Stalling the AGS motor at time t8 may include outputting a voltage to the AGS motor inducing it to rotate in a second direction until a stall current is drawn by the AGS motor. In the example of timeline 700, rotating the AGS motor in the second direction corresponds to driving the AGS to move to a more closed position, until the AGS is fully closed and the stall current (e.g., −stall) is drawn by the AGS motor between times t8 and t9. Times t8 and time t9 may correspond to a start and end time of a first time interval 796. Between times t8 and t9, there is no change in fuel economy (ΔFE remains constant), indicating a lack of movement of the AGS, and validating an AGS mechanical degradation. Accordingly, at time t9, the AGS mechanical degradation status remains as Fail. Further still because an AGS mechanical degradation has been determined, the AGS position cannot be inferred based on the AGS motor stall current, as shown by no inferred AGS position 708 trend line after time t6. In response to the AGS mechanical degradation, at time t9, a notification may be sent to the vehicle operator and the AGS system may be disabled.

In this way, a technical result may be achieved in that degradation modes of the AGS including faulty AGS position sensors or a mechanical AGS degradation can be distinguished. Furthermore, in the event of an AGS position sensor degradation, the AGS position can be inferred so that operation of the AGS and the fuel consumption reduction advantages conferred therefrom can be at least partially preserved. Further still, inferring the AGS position via AGS motor stall current is more reliable over both higher and lower ambient temperatures as compared to inference of AGS position via engine temperature changes, which can vary in reliability depending on engine temperature and ambient temperature.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle, comprising:
during a first condition comprising when an active grille shutter (AGS) position change over a first interval is less than a threshold position change, and following the first interval:
actuating an AGS motor to fully open or fully close an AGS to contact an end stop and stall the AGS motor for a second interval;
calculating a fuel economy change over the second interval; and
determining a degradation of an AGS sensor based on the fuel economy change being greater than a threshold fuel economy change over the second interval.

2. The method of claim 1, wherein the first condition further comprises when an engine load change over the first interval is less than a threshold engine load change.

3. The method of claim 2, wherein stalling the AGS motor comprises actuating the AGS motor to fully close the AGS and draw a stall current.

4. The method of claim 3, wherein the fuel economy change comprises a fuel economy increase and the threshold fuel economy change comprises a threshold fuel economy increase.

5. The method of claim 2, wherein stalling the AGS motor further comprises actuating the AGS motor to fully open the AGS and draw a stall current.

6. The method of claim 5, wherein the fuel economy change comprises a fuel economy reduction and the threshold fuel economy change comprises a threshold fuel economy reduction.

7. The method of claim 4, further comprising determining an AGS mechanical degradation based on the fuel economy change being less than the threshold fuel economy change over the second interval.

8. The method of claim 7, further comprising in response to a key-off condition, fully opening the AGS and stalling the AGS motor.

9. A vehicle system, comprising:
an engine;
active grille shutters (AGS), including an AGS position sensor and an AGS motor; and
a controller, including executable instructions to,
in response to an AGS position change being less than a threshold position change during a measurement period,
actuate the AGS motor to move the AGS to a more closed position until a stall current is drawn by the AGS motor;
calculate a fuel economy increase over a first interval while the stall current is drawn by the AGS motor; and
determine a degradation of the AGS position sensor based on the fuel economy increase being greater than a threshold fuel economy increase.

10. The vehicle system of claim 9, wherein the controller further comprises executable instructions to, in response to the AGS position change being less than the threshold position change during the measurement period,
actuate the AGS motor to move the AGS to a more open position until the stall current is drawn by the AGS motor,
calculate a fuel economy decrease over the first interval while the stall current is drawn by the AGS motor, and
determine the degradation of the AGS sensor based on the fuel economy decrease being greater than a threshold fuel economy decrease over the first interval.

11. The vehicle system of claim 10, wherein the controller further comprises executable instructions to: in response to the degradation of the AGS position sensor, activate a secondary AGS position control mode comprising, actuating the AGS motor to move the AGS to the more open position until the stall current is drawn by the AGS motor to fully open the AGS, and actuating the AGS motor to move the AGS to the more closed position until the stall current is drawn by the AGS motor to fully close the AGS.

12. The vehicle system of claim 11, wherein the controller further comprises executable instructions to determine an AGS mechanical degradation based on the fuel economy increase being less than the threshold fuel economy increase over the first interval or based on the fuel economy decrease being less than the threshold fuel economy decrease over the first interval.

13. The vehicle system of claim 12, wherein the secondary AGS position control mode further comprises executable instructions to actuate the AGS motor to move the AGS to the more open position until the stall current is drawn by the AGS motor, in response to a key-off condition.

14. The vehicle system of claim 13, wherein the secondary AGS position control mode further comprises executable instructions to store an AGS position as being fully open in controller memory, in response to the key-off condition.

15. A method for a vehicle, executed by an onboard vehicle controller, comprising: in response to an AGS position change being less than a threshold position change during a measurement period, actuating an AGS motor to move an AGS to a more closed position until a stall current is drawn by the AGS motor;

calculating a fuel economy increase over a first interval while the stall current is drawn by the AGS motor; and determining a degradation in an AGS sensor based on the fuel economy increase being greater than a threshold fuel economy increase.

16. The method of claim 15, wherein the measurement period comprises an interval during which an engine load condition is met.

17. The method of claim 16, wherein the engine load condition comprises an engine load change over the measurement period being less than a threshold engine load change.

18. The method of claim 17, further comprising: in response to the AGS position change being less than the threshold position change during the measurement period, actuating the AGS motor to move the AGS to a more open position until the stall current is drawn by the AGS motor;

calculating a fuel economy decrease over the first interval while the stall current is drawn by the AGS motor; and determining the degradation of the AGS sensor based on the fuel economy decrease being greater than a threshold fuel economy decrease over the first interval.

19. The method of claim 18, further comprising in response to the degradation of the AGS sensor, activating a secondary AGS position control mode comprising, actuating the AGS motor to move the AGS to the more open position until the stall current is drawn by the AGS motor to fully open the AGS, and actuating the AGS motor to move the AGS to the more closed position until the stall current is drawn by the AGS motor to fully close the AGS.

20. The method of claim 19, wherein the secondary AGS position control mode further comprises in response to a key-off engine condition, actuating the AGS motor to move the AGS to the more open position until the stall current is drawn by the AGS motor to fully open the AGS.

* * * * *